US010797392B2

United States Patent
Boesch (10) Patent No.: US 10,797,392 B2
(45) Date of Patent: Oct. 6, 2020

(54) FOLDED, THREE DIMENSIONAL (3D) ANTENNAS AND RELATED DEVICES

(71) Applicant: Sensus Spectrum, LLC, Morrisville, NC (US)

(72) Inventor: Ronald D. Boesch, Cary, NC (US)

(73) Assignee: Sensus Spectrum, LLC, Morrisville, NC (US)

(*) Notice: Subject to any disclaimer, the term of this patent is extended or adjusted under 35 U.S.C. 154(b) by 137 days.

(21) Appl. No.: 15/722,098

(22) Filed: Oct. 2, 2017

(65) Prior Publication Data

US 2019/0103673 A1    Apr. 4, 2019

(51) Int. Cl.
| | | |
|---|---|---|
| *H01Q 5/335* | (2015.01) | |
| *H01Q 1/24* | (2006.01) | |
| *H01Q 1/48* | (2006.01) | |
| *H04M 1/02* | (2006.01) | |
| *H01Q 9/04* | (2006.01) | |
| *H01Q 1/22* | (2006.01) | |

(52) U.S. Cl.
CPC .......... *H01Q 5/335* (2015.01); *H01Q 1/2233* (2013.01); *H01Q 1/24* (2013.01); *H01Q 1/48* (2013.01); *H01Q 9/0421* (2013.01); *H04M 1/02* (2013.01)

(58) Field of Classification Search
CPC .......... H01Q 5/335; H01Q 1/24; H01Q 1/48; H01Q 9/0421; H01Q 9/0414; H01Q 1/2233; H04M 1/02
See application file for complete search history.

(56) References Cited

U.S. PATENT DOCUMENTS

| | | | |
|---|---|---|---|
| 2002/0075192 A1 | 6/2002 | Iwai et al. | |
| 2006/0012524 A1* | 1/2006 | Mierke | H01Q 1/243 343/700 MS |
| 2013/0229318 A1 | 9/2013 | Ng et al. | |
| 2014/0210674 A1* | 7/2014 | Yonei | H01Q 9/0421 343/700 MS |
| 2017/0141480 A1 | 5/2017 | Ng et al. | |

FOREIGN PATENT DOCUMENTS

JP    5636721 B2    12/2014

OTHER PUBLICATIONS

Notification of Transmittal of the International Search Report and the Written Opinion of the International Searching Authority, PCT/US2018/039667, dated Oct. 1, 2018, 15 pages.
Notification Concerning Transmittal of International Preliminary Report on Patentability; PCT/US2018/039667, dated Oct. 1, 2018, 9 pages.

* cited by examiner

*Primary Examiner* — Hai V Tran
*Assistant Examiner* — Michael M Bouizza
(74) *Attorney, Agent, or Firm* — Stanek Lemon Crouse & Meeks, PA (57) ABSTRACT

A folded antenna is provided including an antenna having a fold therein. The fold in the antenna divides the antenna into first and second radiating portions. The first radiating portion of the folded antenna is planar and the second radiating portion has a window therein. The first and second radiating portions of the folded antenna are coupled at the fold in the antenna having a predetermined angle therebetween. Related antenna systems and meters are also provided.

20 Claims, 11 Drawing Sheets

POWER AND EFFICIENCY RESULTS
FOLDED ANTENNA, 840 MHz

| QUANTITY | 0.6 GHz | 0.7 GHz | 0.8 GHz | 0.85 GHz | 0.9 GHz | 0.95 GHz | 1 GHz | 1.2 GHz |
|---|---|---|---|---|---|---|---|---|
| NET INPUT POWER | 5.41e-05 W | 0.0001562 W | 0.000825 W | 0.001821 W | 0.002048 W | 0.001417 W | 0.0009738 W | 0.0004076 W |
| NET AVAILABLE POWER | 0.0025 W | 0.0025 W | 0.0025 W | 0.0025 WT | 0.0025 W | 0.0025 W | 0.0025 W | 0.0025 W |
| SYSTEM EFFICIENCY | 1.247% | 5.282% | 31.716% | 71.454% | 81.121% | 56.395% | 38.863% | 16.418% |
| RADIATION EFFICIENCY | 57.608% | 84.554% | 96.110% | 98.112% | 99.039% | 99.493% | 99.776% | 100.685% |
| RADIATED POWER | 3.117e-05 W | 0.0001321 W | 0.0007929 W | 0.0001786 W | 0.002028 W | 0.00141 W | 0.0009716 W | 0.0004104 W |
| POWER SCALING FACTOR | 1 | 1 | 1 | 1 | 1 | 1 | 1 | 1 |

839 MHz

| TABLE ANGLE | VERTICAL RAW | GAIN, dBi | HORIZONTAL RAW | GAIN, dBi |
|---|---|---|---|---|
| 0 | -50.3 | -11 | -42.8 | -3.9 |
| 20 | -51.9 | -12.6 | -48.2 | -9.3 |
| 40 | -52.6 | -13.3 | -50.9 | -12 |
| 60 | -52.5 | -13.2 | -55 | -16.1 |
| 80 | -55.7 | -16.4 | -51.4 | -12.5 |
| 100 | -58.2 | -18.9 | -43.8 | -4.9 |
| 120 | -54.6 | -15.3 | -42.4 | -3.5 |
| 140 | -53.4 | -14.1 | -38.1 | 0.8 |
| 160 | -51.3 | -12 | -37.2 | 1.7 |
| 180 | -51.4 | -12.1 | -40.2 | -1.3 |
| 200 | -52.4 | -13.1 | -46.3 | -7.4 |
| 220 | -47.2 | -7.9 | -51.2 | -12.3 |
| 240 | -53.1 | -13.8 | -47.7 | -8.8 |
| 260 | -50.5 | -11.2 | -43.8 | -4.9 |
| 280 | -48.1 | -8.8 | -42.5 | -3.6 |
| 300 | -46.8 | -7.5 | -41.2 | -2.3 |
| 320 | -47.5 | -8.2 | -39.7 | -0.8 |
| 340 | -49 | -9.7 | -40 | -1.1 |

851 MHz

| TABLE ANGLE | VERTICAL RAW | GAIN, dBi | HORIZONTAL RAW | GAIN, dBi |
|---|---|---|---|---|
| 0 | -50.2 | -11.1 | -42.6 | -3.5 |
| 20 | -52.3 | -13.2 | -48.4 | -9.3 |
| 40 | -54.3 | -15.2 | -50.7 | -11.6 |
| 60 | -55.4 | -16.3 | -57.5 | -18.4 |
| 80 | -54.8 | -15.7 | -53 | -13.9 |
| 100 | -61 | -21.9 | -43.9 | -4.8 |
| 120 | -53.3 | -14.2 | -43.1 | -4 |
| 140 | -51.8 | -12.7 | -38.9 | 0.2 |
| 160 | -51.4 | -12.3 | -38.5 | 0.6 |
| 180 | -53 | -13.9 | -40.5 | -1.4 |
| 200 | -52.8 | -13.7 | -46.8 | -7.7 |
| 220 | -48.9 | -9.8 | -51.6 | -12.5 |
| 240 | -55 | -15.9 | -48.6 | -9.5 |
| 260 | -53 | -13.9 | -43.4 | -4.3 |
| 280 | -47.2 | -8.1 | -42.7 | -3.6 |
| 300 | -47.9 | -8.8 | -41 | -1.9 |
| 320 | -49 | -9.9 | -39.7 | -0.6 |
| 340 | -50.9 | -11.8 | -40.3 | -1.2 |

ANTENNA HEIGHT ___ METERS

| ANGLE | LINEAR GAIN 835 MHz | 851 MHz | 413 MHz | 423 MHz |
|---|---|---|---|---|
| 0 | -3.1 | -2.5 | 0.48681 | 0.52431 |
| 20 | -0.5 | -0.8 | 0.8834 | 0.82465 |
| 40 | -0.1 | -0.1 | 0.98312 | 0.97329 |
| 60 | -1.2 | -1.1 | 0.76667 | 0.77745 |
| 80 | -2.5 | -2.3 | 0.56834 | 0.5914 |
| 100 | -4.0 | -3.8 | 0.39945 | 0.41227 |
| 120 | -7.6 | -8.6 | 0.17351 | 0.13791 |
| 140 | -6.6 | -7.9 | 0.22107 | 0.16095 |
| 160 | -6.4 | -6.7 | 0.23095 | 0.21248 |
| 180 | -1.0 | -1.2 | 0.80297 | 0.76517 |
| 200 | 1.9 | 0.8 | 1.5422 | 1.20704 |
| 220 | 0.9 | 0.4 | 1.24117 | 1.10083 |
| 240 | -3.2 | -3.6 | 0.4762 | 0.43615 |
| 260 | -4.7 | -4.7 | 0.33648 | 0.33759 |
| 280 | -11.0 | -11.7 | 0.07914 | 0.06765 |
| 300 | -11.4 | -14.2 | 0.07241 | 0.0379 |
| 320 | -9.6 | -10.0 | 0.10987 | 0.09938 |
| 340 | -7.6 | -7.8 | 0.17244 | 0.16535 |

| | 835 MHz | 851 MHz |
|---|---|---|
| AVERAGE | -2.8 | -3.1 |
| PEAK | 1.9 | 0.8 |

FOLDED, THREE DIMENSIONAL (3D) ANTENNAS AND RELATED DEVICES

FIELD

The present inventive concept relates generally to antennas and, more particularly, to antennas suitable for use in meters.

BACKGROUND

Antennas are used in smart meters so meters can communicate with a remote location. For example, smart meters can measure customer usage of, for example, energy, water or gas, and transmit customer usage directly to the utility, possibly eliminating the practice of estimated bills. Thus, smart meters may provide near-real time usage information about how much, when and in some cases, at what price, a customer uses energy, water or gas. Smart meters work as a part of a smart grid and, therefore, provide improved outage detection and notification. Some smart meters can electronically report the location of outages before a call to the utility is made by a customer, making restoration faster and status notification much easier.

Having integrated antennas in the meter itself allows the meter to have this "smart" capability. However, as meters become smaller and more compact, providing an antenna with good efficiency in the smaller housing becomes a challenge.

SUMMARY

Some embodiments of the present inventive concept provide folded antennas including an antenna having a fold therein. The fold in the antenna divides the antenna into first and second radiating portions. The first radiating portion of the folded antenna is planar and the second radiating portion has a window therein. The first and second radiating portions of the folded antenna are coupled at the fold in the antenna having a predetermined angle therebetween.

In further embodiments, the angle between the first and second radiating portions of the folded antenna may be about 90 degrees such that the first and second radiating portions of the folded antenna are substantially perpendicular to one another.

In still further embodiments, the antenna may further include an RF feed leg and a ground leg coupled to the second radiating portion having the window therein. The RF feed leg and the ground leg may be coupled to a printed circuit board (PCB) having first and second surfaces. The PCB may be a ground plane for the antenna.

In some embodiments, the first radiating portion of the folded antenna may be spaced apart from the first surface of the PCB by a space of from about 1.0 mm to about 3.0 mm.

In further embodiments, the RF feed leg and the ground leg may be coupled a first surface of the PCB having few components thereon.

In still further embodiments, the first surface of the PCB may further include capacitors thereon. The capacitors may be removed and spaced apart from the folded antenna on the first surface of the PCB.

In some embodiments, the folded antenna may resonate at and is tuned for frequencies of 839 MHz and 851 MHz.

In further embodiments, the planar first radiating portion of the folded antenna may have a width W2 of from about 43 mm to about 45 mm and a height H1 of from about 20 mm to about 22 mm.

In still further embodiments, the windowed second radiating portion of the folded antenna may include first, second and third sides forming a triangle with a window therebetween.

In some embodiments, the first side may have an interior length L1 of from about 20 mm to about 24 mm and an exterior length L4 of from about 30 mm to about 32 mm; the second side may have an interior length L2 of from about 26 mm to about 30 mm and an exterior length L5 of from about 35 mm to about 37; and the third side may have an interior length L3 of from about 32 mm to about 36 mm and an exterior length L6 of from about 43 mm to about 45 mm.

In further embodiments, the presence of the window may reduce the likelihood that a short will occur between sides of the triangle and simulates a longer length to provide a specific frequency.

Some embodiments of the present inventive concept provide antenna systems including a folded antenna having a fold therein. The fold in the antenna divides the antenna into first and second radiating portions. The first radiating portion of the folded antenna is planar and the second radiating portion has a window therein. The first and second radiating portions of the folded antenna are coupled at the fold in the antenna having a predetermined angle therebetween. The system further includes a housing configured to receive the folded antenna therein and a printed circuit board (PCB) coupled to the folded antenna and configured to cover the folded antenna when the folded antenna is positioned in the housing.

Further embodiments of the present inventive concept provide smart meters include a folded antenna system. The folded antenna system includes a folded antenna having a fold therein. The fold in the antenna divides the antenna into first and second radiating portions. The first radiating portion of the folded antenna is planar and the second radiating portion has a window therein. The first and second radiating portions of the folded antenna are coupled at the fold in the antenna having a predetermined angle therebetween. The system further includes a housing configured to receive the folded antenna therein and a printed circuit board (PCB) coupled to the folded antenna and configured to cover the folded antenna when the folded antenna is positioned in the housing.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed in the background of the inventive concept, having integrated antennas in the meter itself allows the meter to have this "smart" capability. However, as meters become smaller and more compact, providing an antenna with good efficiency at low frequencies in the smaller housing becomes a challenge. Thus, embodiments of the present inventive concept provide an antenna configured to fit in a predefined space without sacrificing performance as will be discussed further below with respect to FIGS. 1 through 13.

In particular, in some embodiments of the present inventive concept, antennas are provided in a module that provides the Wide-Area Network (WAN) communications using a network, such as FlexNet. Although embodiments of the present inventive concept are discussed with respect to a WAN, a Home-Area Network (HAN) module may also be provided without departing from the scope of the present inventive concept. For example, a HAN module may be provided as part of a Communication Hub attached to a meter, for example, an electric meter. Spacing for the antenna within the modules is very small, thus, requiring a very compact antenna as will be discussed herein.

Figure 1:
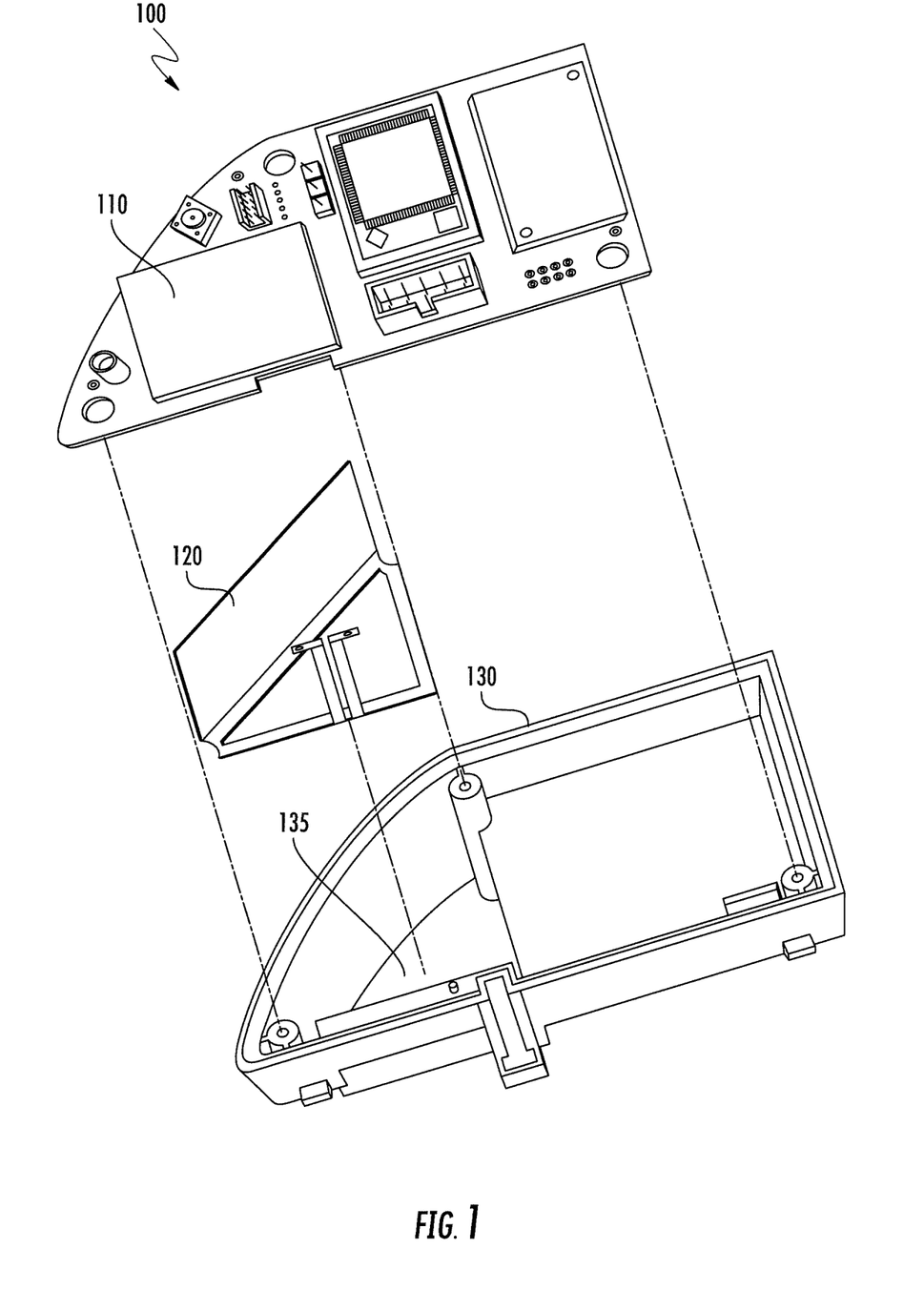
FIG. 1 is an exploded view of an antenna assembly in accordance with some embodiments of the present inventive concept.
Figure 2:
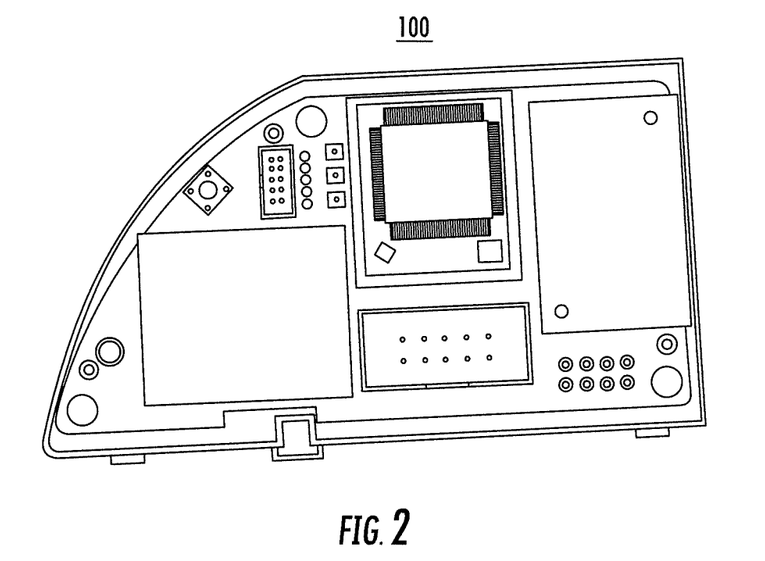
FIG. 2 is a top view of an assembled antenna assembly with a printed circuit board positioned on the housing in accordance with some embodiments of the present inventive concept.
Figure 3:
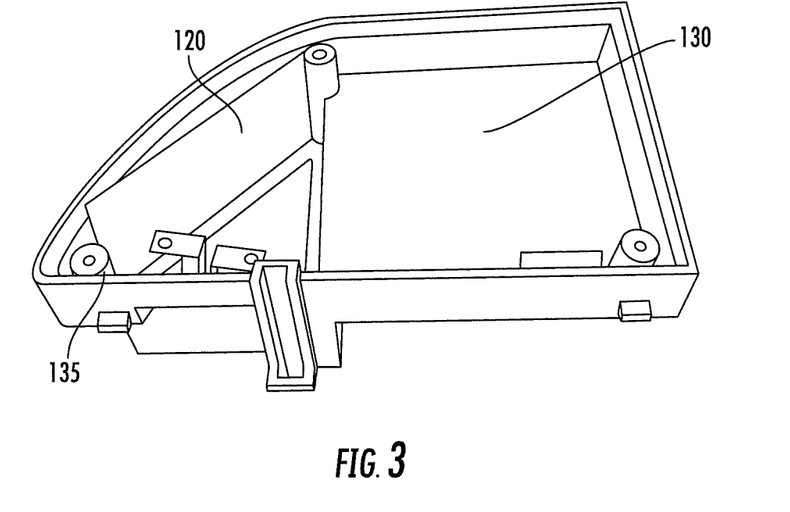
FIG. 3 is a perspective view of the housing of the assembly having an antenna positioned therein in accordance with some embodiments of the present inventive concept.

Referring first to FIG. 1, an antenna assembly in accordance with some embodiments of the present inventive concept will be discussed. As illustrated in FIG. 1, the antenna assembly 100 includes a housing 130, an antenna 120 and a printed circuit board 110. It will be understood that the assembly 100 provided in FIG. 1 is provided for example only and, therefore, embodiments of the present inventive concept are not limited to the configuration depicted therein. The three elements of the assembly are designed to fit together such that the antenna 120 is positioned in a portion 135 of the housing 130 and the printed circuit board 110 is positioned to cover the antenna 120 inside the housing 130. The completed assembly 100 is illustrated, for example, in FIG. 2. As illustrated therein, the antenna 120 (obscured by the PCB 110) is positioned in housing 130. In particular, the antenna 120 is positioned in the portion 135 in the housing 130 as illustrated in FIG. 3. Thus, antennas 120 in accordance with embodiments discussed herein are designed to fit within the constrained volume of the housing 130. Although the portion 135 of the housing 130 is shown in the figures as having a specific shape and depth. Embodiments of the present inventive concept are not limited to this shape and depth. The antenna 120 is customized to fit within this particular housing. Providing the folded antenna 120 allows the desired frequencies to be achieved in the limited space as will be discussed further herein.

Some embodiments of the present inventive concept operate at frequencies having relatively long wavelengths, for example, 839 and 851 MHz. It will be understood that antennas generally have some bandwidth that they operate across. Some embodiments of the present inventive concept transmit at a frequency that is different from the receive frequency, for example, 839 MHz and 851 MHz, respectively. Operating at both frequencies adds to the design constraints for good performance in the product. However, embodiments of the present inventive concept are not limited to this configuration. The size constraints of the housing 130 made achieving the 839 and 851 MHz frequencies difficult.

Generally, a planar inverted-F Antenna ("PIFA") antenna needs no less than half of a perimeter of the rectangle to be a quarter wavelength. A quarter-wavelength (in Air) for the lowest Frequency in accordance with embodiments discussed herein, 839 MHz, is about 8.9 cm. The perimeter available at the farthest surface may be about 13 cm and a quarter wave is half of this perimeter or 6.5 cm. Thus, the quarter wave at the desired frequency is 8.9 cm, or 37% longer than is available in the one plane, this presented a problem.

Accordingly, embodiments of the present inventive concept provide an antenna that is configured to support the desired frequencies but is capable of being properly fitted within the housing 130 as illustrated in, for example, FIG. 3 above. As will be discussed further below, antennas in accordance with some embodiments discussed herein are "folded" into a third dimension and have a "window" in a top portion thereof. Folding the antenna into a third dimension adds length that is otherwise unavailable due to space constraints in the housing, i.e. the folding of the antenna essentially allows the perimeter of the antenna to be lengthened. Providing a window in the top-surface of the antenna reduces the likelihood, or possibly prevents, the current from cutting across a top surface of the antenna, reducing the perimeter. Most antennas radiate in a plane, the folded antenna in accordance with embodiments discussed herein gives a third dimension, which provides volume, with a window that provides the additional length needed to support the desired frequencies. As will be discussed, antennas fabricated in accordance with embodiments discussed herein demonstrate from about −2.5 dBi (decibels relative to isotropic radiator) to about −3 dBi average gain in the desired frequency band, for example, 839 and 851 MHz.

Decibels relative to isotropic radiator ("dBi") as used herein defines the gain of an antenna system relative to an isotropic radiator at radio frequencies. The symbol is an abbreviation for "decibels relative to isotropic." The dBi specification is based on the decibel, a logarithm is measure of relative power. Suppose an antenna A produces an electromagnetic field of intensity $I_A$ microwatts per square meter ($I_A$ μW/m$^2$) in its favored direction at a point located some distance away. Further suppose an isotropic antenna Q produces an electromagnetic field of intensity $I_Q$ μW/m$^2$ at the same distance. Then the gain G of antenna A, in dBi, is represent at by Eqn. (1) set out below.

$$G=10 \log_{10}(I_A/I_Q) \qquad \text{Eqn. (1)}$$

where $I_A$ is the electromagnetic field of intensity of antenna A and $I_Q$ is the electromagnetic field of intensity of antenna Q, both measured in μW/m$^2$.

Figure 4A:
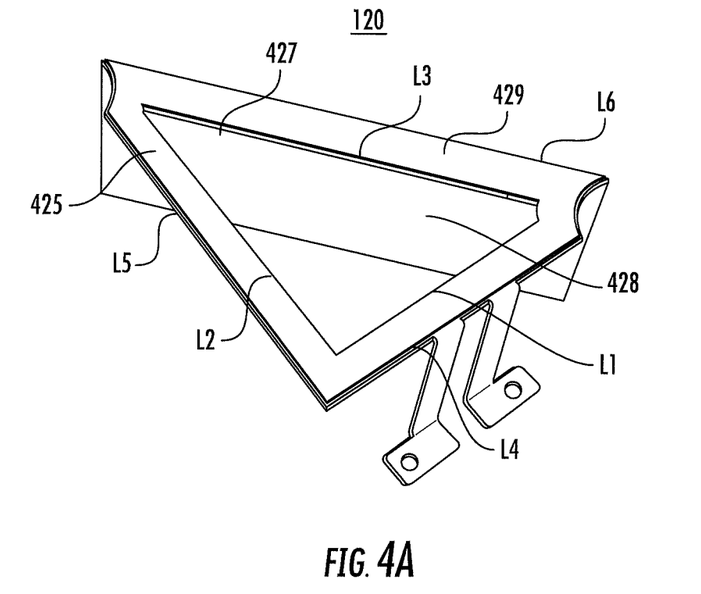
FIGS. 4A and 4B are a top view and side perspective view of folded antennas, respectively, in accordance with embodiments of the present inventive concept.
Figure 4B:
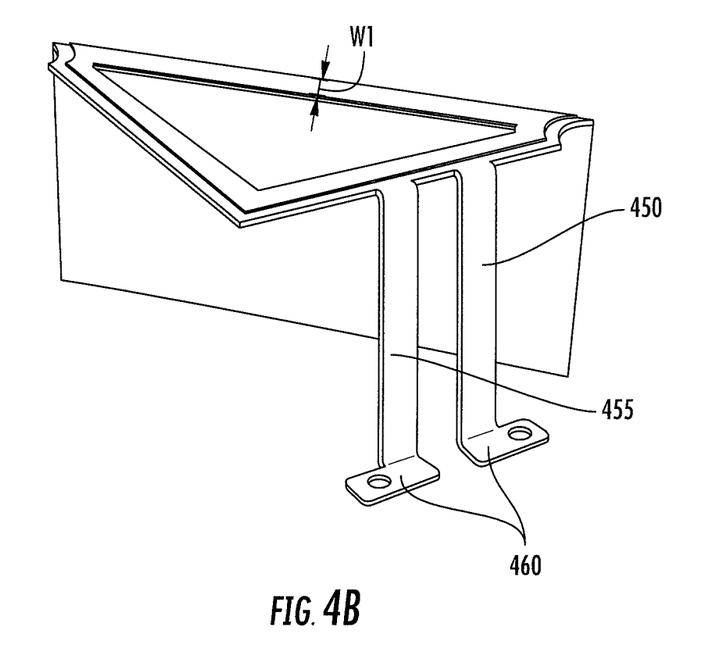

Referring now to FIGS. 4A and 4B, a folded antenna 120 in accordance with some embodiments of the present inventive concept will be discussed. As illustrated in FIGS. 4A and 4B, the folded antenna 120 includes an antenna element 425, an RF feed leg 455 and a ground leg 450. As illustrated, the antenna element 425 is folded to provide a planar portion 427 and windowed portion 429. In FIGS. 4A and 4B, the planar portion 427 (first radiating portion) and the windowed portion 429 (second radiating portion) are provided substantially perpendicular to one another (i.e. at 90 degree angles), however, embodiments of the present inventive concept are not limited to this configuration. For example, the angle between the first and second radiating portions 427 and 429 can be greater or less than 90 degrees without departing from the scope of the present inventive concept. In some embodiments, the planar portion 427 of the antenna 425 is not windowed, thus providing the most resonating area possible (volume) and, thereby, increasing, or possibly maximize, the gain. In some embodiments, the planar portion has a width W2 (FIG. 6) of from about 43 mm to about 45 mm and a height H1 (FIG. 6) of from about 20 mm to about 22 mm. Furthermore, although the planar portion 427 is shown as having a rectangular shape, embodiments of the present inventive concept are not limited to this configuration. For example, the planar portion 427 may have any shape conducive to providing the necessary volume for the folded antenna.

The windowed portion 429 includes the window 428, which is provided to provide length needed for the desired frequencies as discussed above. Embodiments illustrated have a triangular shape with a window 428 therein. The three sides of the triangle may each have a width W of about 3.0 mm. The widths W of these portion may be adjusted to provide the necessary length to provide the desired frequencies. However, the window 428 must be large enough to reduce the likelihood that an electrical connection (short) across the window 428.

Furthermore, although the windowed portion 429 is shown having a triangular shape, embodiments of the present inventive concept are not limited to this configuration. For example, the windowed portion may have any shape conducive to a housing in which the antenna is positioned. For example, the windowed portion 429 may have four or more sides creating various shapes without departing from the scope of the present inventive concept.

Referring again to FIG. 4A, the windowed portion 429 illustrated therein has three sides each having an interior lengths (i.e. the lengths of the sides on the interior portion of the triangle) L1, L2 and L3 and exterior lengths L4, L5 and L6 (i.e. the lengths of the sides on the exterior portions of the triangle) L4, L5 and L6. The interior length L1 may be from about 20 mm to about 24 mm; the interior length L2 may be from about 26 mm to about 30 mm; and the interior length L3 may be from about 32 mm to about 36 mm without departing from the scope of the present inventive concept. Similarly, the exterior length L4 may be from about 30 mm to about 32 mm; the exterior length L5 may be from about 35 mm to about 37 mm; and the exterior length L6 may be from about 43 mm to about 45 mm.

The radio frequency (RF) feed 455 for the antenna may be provided by a ladder line, for example, a standard Ladder-Leg type feed for a PIFA. Although the RF leg 455 and ground leg 450 are illustrated in specific positions in FIGS. 4A and 4B, the positions of these legs can be swapped without departing from the scope of the present inventive concept. In other words, the specific position of the RF feed and/or ground leg does not significantly affect performance of the folded antenna in accordance with embodiments discussed herein.

Figure 5:
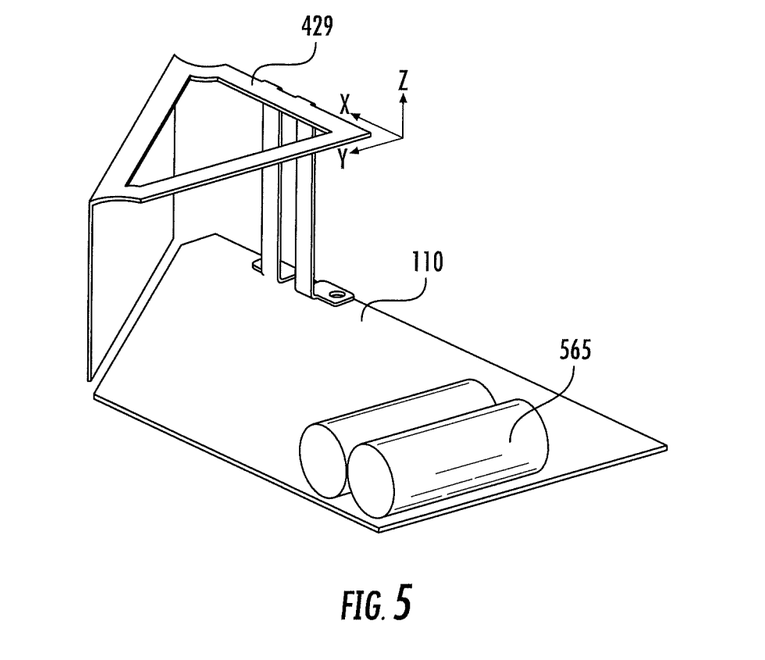
FIG. 5 is a diagram of a folded antenna attached to a printed circuit board (PCB) in accordance with some embodiments of the present inventive concept.

As further illustrated in FIGS. 4A and 4B, each of the legs of the ladder line include "feet" 460 that enable the antenna to be coupled to the PCB 110 as illustrated in FIG. 5. The area for the feet 460 (feed leg contacts) on the PCB are made as small as possible such that they present only a small parasitic capacitance to the RF path, thus, reducing any RF calibration offset that may be needed for the conducted verses radiated measurement of RF transmit power.

The RF input to the antenna has matching components available on the PCB to get the energy to/from the radiating structure. The PCB 110 (FIG. 5) may be used as a ground plane for the antenna. The side of the PCB 110 coupled to the antenna is designed to provide as much ground sheet area for the antenna to work against as possible. Furthermore, a fewest amount components are provided on the side of the PCB 110 attached to the antenna to reduce the effects of any changes needed for design updates. As illustrated in FIG. 5, the large capacitors 565 are placed on the same side of the PCB as the antenna, but are placed as far from the antenna as possible. In some embodiments, the capacitors may be from about 3.0 Farads to about 6.0 Farads. It will be understood that the capacitors may be replaced with other components without departing from the scope of the present inventive concept. The performance of the antenna is easier to maintain when as many of the components as possible are provided on a side of the PCB opposite side the folded antenna.

It will be understood that embodiments of the present inventive concept illustrated in FIGS. 1 through 5 illustrate example embodiments of a folded antenna assembly in accordance with some embodiments of the present inventive concept. Thus, embodiments of the present inventive concept are not limited thereto. For example, the antenna system depicted in FIGS. 1 through 5 including various components may include more or fewer components without departing from the scope of the present inventive concept.

Figure 6:
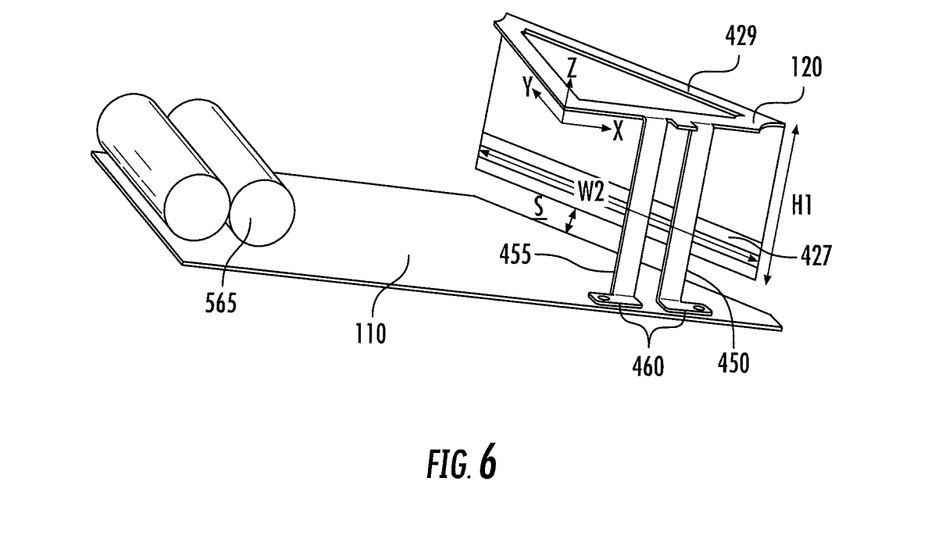
FIG. 6 is a perspective view of a folded antenna and PCB in accordance with some embodiments of the present inventive concept.

Referring now to FIG. 6, a perspective view of a folded antenna and PCB in accordance with some embodiments of the present inventive concept will be discussed. As illustrated therein, the folded antenna 120 is provided on the PCB 110 using RF feed and ground legs 455 and 450, respectively, with feet 460 configured to attach the PCB 110. As few components as possible are provided on the same side of the PCB 110 as the antenna 120. However, as illustrated, larger capacitors 565 are provided on the PCB 110, but are provided as far from the antenna 120 as possible. As further illustrated, the planar portion 427 of the folded antenna is spaced apart from the PCB 110 by a spacing S. The spacing S may be from about 1.0 mm to about 3.0 mm without departing from the scope of the present inventive concept.

Figure 7:
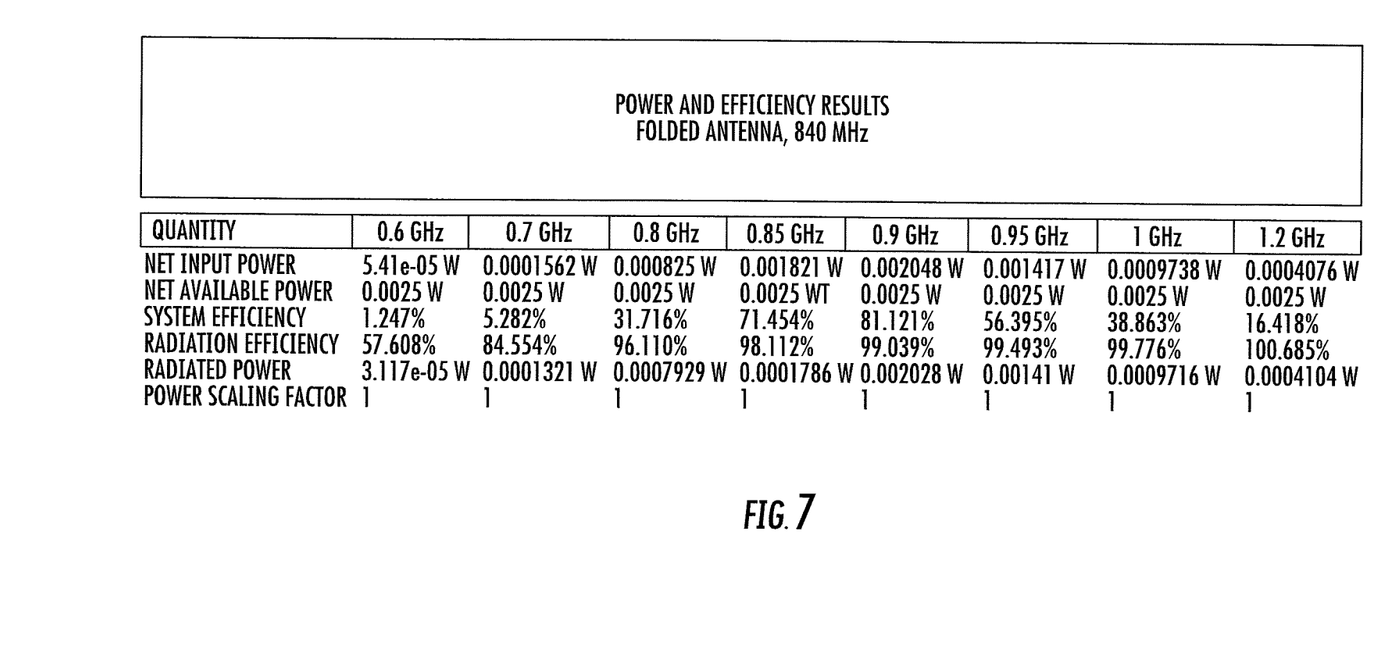
FIG. 7 is a table illustrating power and efficiency simulation results in accordance with some embodiments of the present inventive concept.

FIG. 7 is a table illustrating power and efficiency simulation results in accordance with some embodiments of the present inventive concept. An 840 MHz folded antenna in accordance with some embodiments of the present inventive concept was simulated and the simulation results are provided in FIG. 7. In particular, net input power, net available power, system efficiency, radiation efficiency, radiated power and a power scaling factor for each of 0.6 GHz, 0.7 GHz, 0.8 GHz, 0.9 GHz, 0.95 GHz, 1.0 GHz, and 1.2 GHz are illustrated in the table of FIG. 7.

Figure 8:
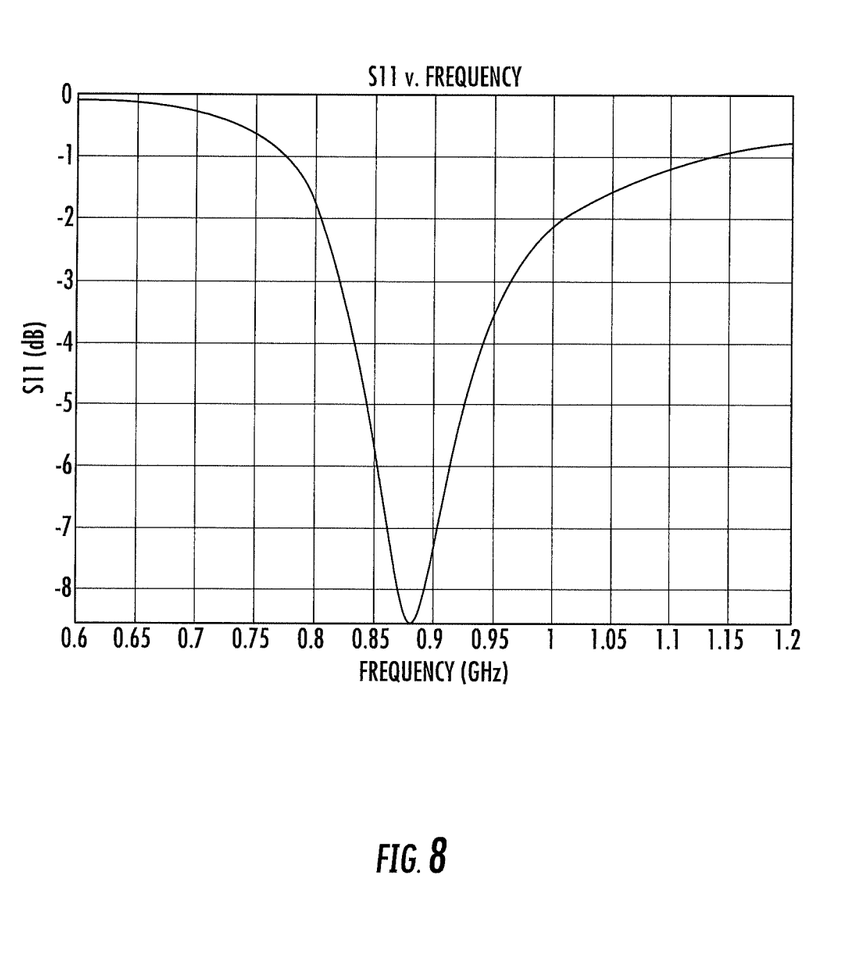
FIG. 8 is graph illustrating return loss (S11) for a simulation in accordance with some embodiments of the present inventive concept.

FIG. 8 is graph illustrating return loss (S11) for a simulation in accordance with some embodiments of the present inventive concept. As illustrated in FIG. 8, return loss (S11) is measured in dB. Return loss (S11) provides an indicator of how much power is transferred into the antenna so that it can be radiated.

Figure 9:
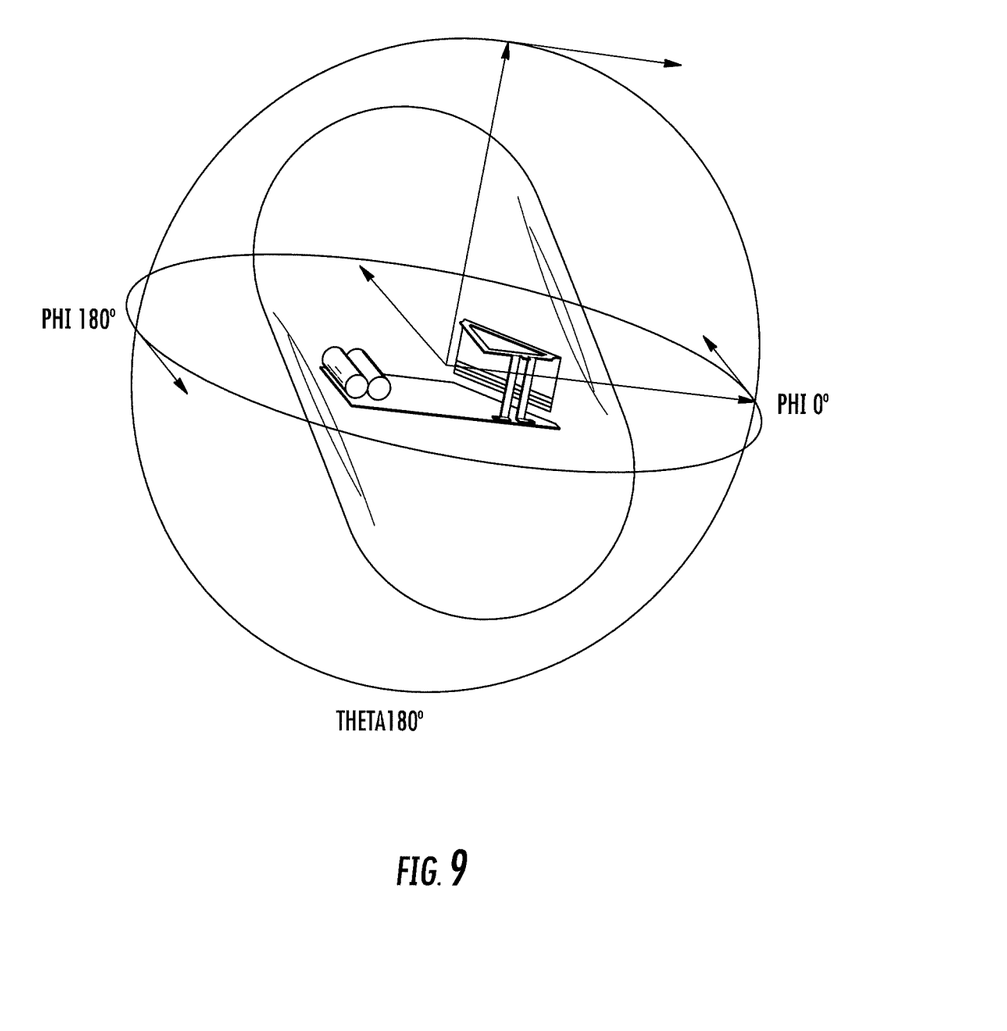
FIG. 9 is a diagram illustrating a simulation showing the realized gain pattern in relation to the antenna and PCB antenna in accordance with some embodiments of the present inventive concept.

FIG. 9 is a diagram illustrating a simulation showing the realized gain pattern in relation to the antenna and PCB antenna in accordance with some embodiments of the present inventive concept. In particular, FIG. 9 illustrates an expected three dimensional (3D) antenna radiation pattern relative to the PCB antenna and antenna.

Figure 10:
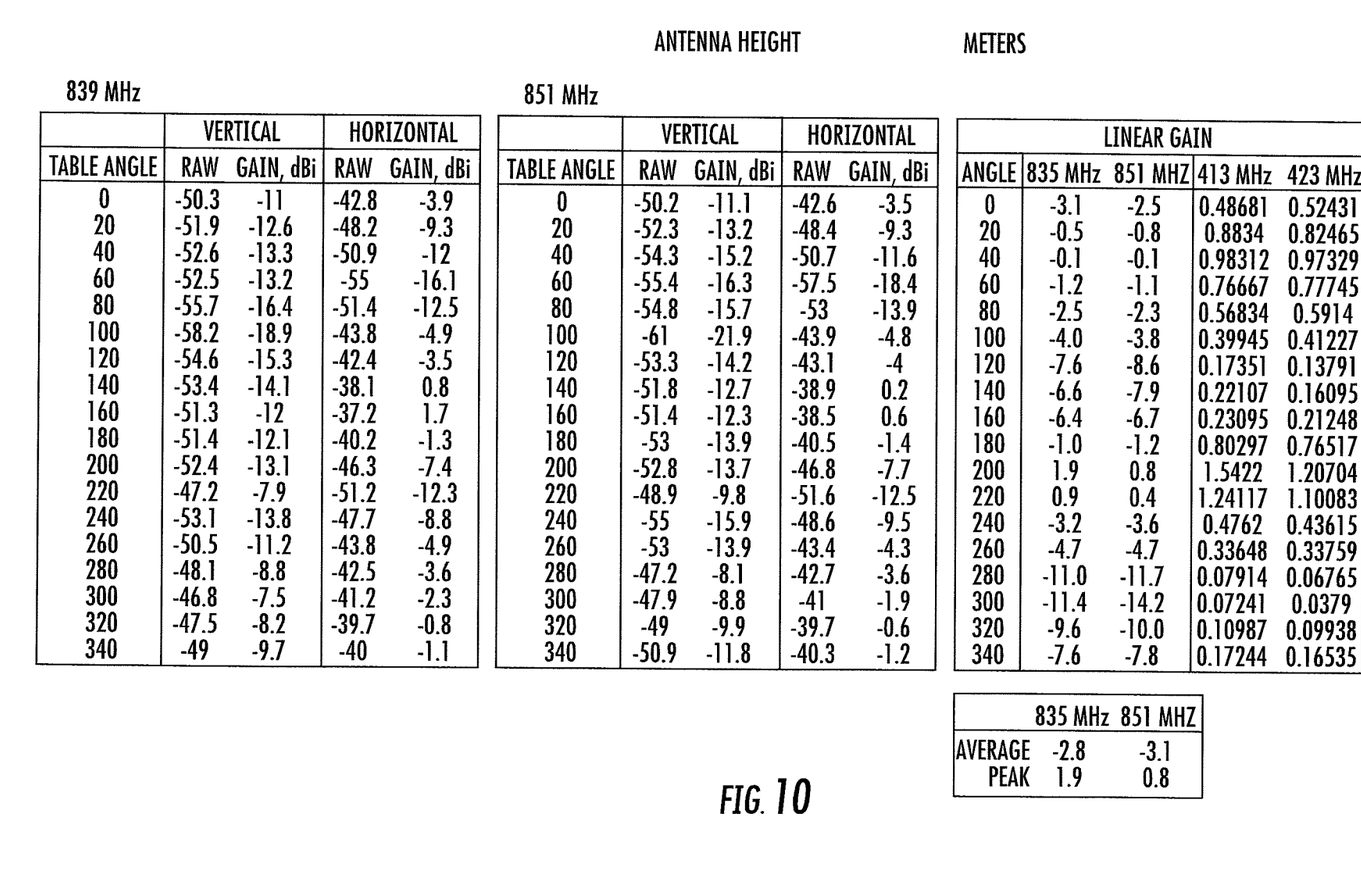
FIG. 10 is a table illustrating vertical and horizontal gain data for both 839 and 851 MHz in accordance with some embodiment of the present inventive concept.

Referring now to FIG. 10, a table illustrating vertical and horizontal gain test data for both 839 and 851 MHz in accordance with some embodiment of the present inventive concept will be discussed. Thus, the data illustrated in FIG. 10 is actual measured data on one antenna to assess the performance in both the receive and transmit bands. In particular, the table illustrates the vertical and horizontal raw data and gain data (dBi) for both 839 and 851 MHz at various table angles (0, 20, 40, 60, 80, 100, 120, 140, 160, 180, 200, 220, 240, 260, 280, 300, 320 and 340). As further illustrated, the table of FIG. 10 also illustrates linear gain, average gain and peak gain. For 839 MHz, the average gain was −2.8 and the peak gain was 1.9 (dBi). Similarly, for 851 MHz, the average gain was −3.1 and the peak gain was 0.8 (dBi).

Figure 11:
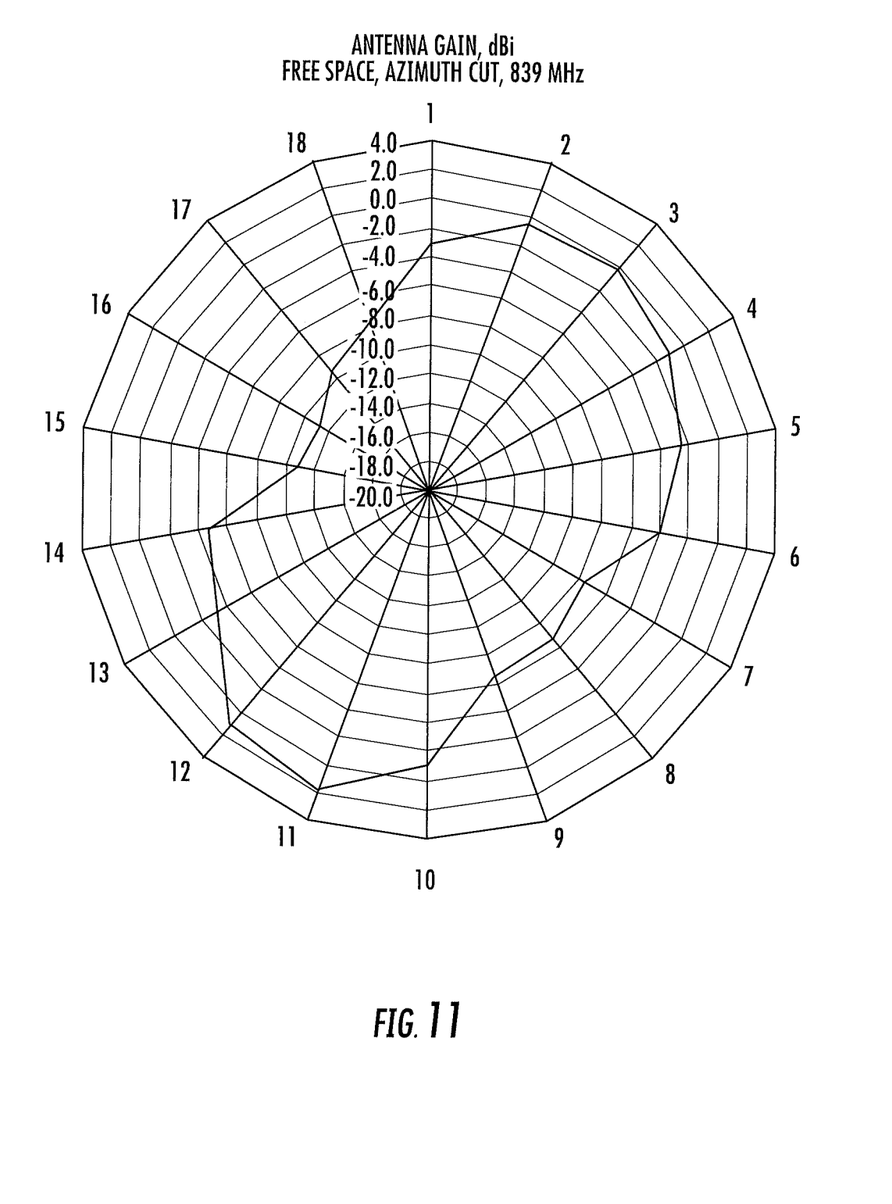
FIG. 11 is a diagram illustrating antenna gain (dBi) for a frequency of 839 MHz in accordance with some embodiments of the present inventive concept.
Figure 12:
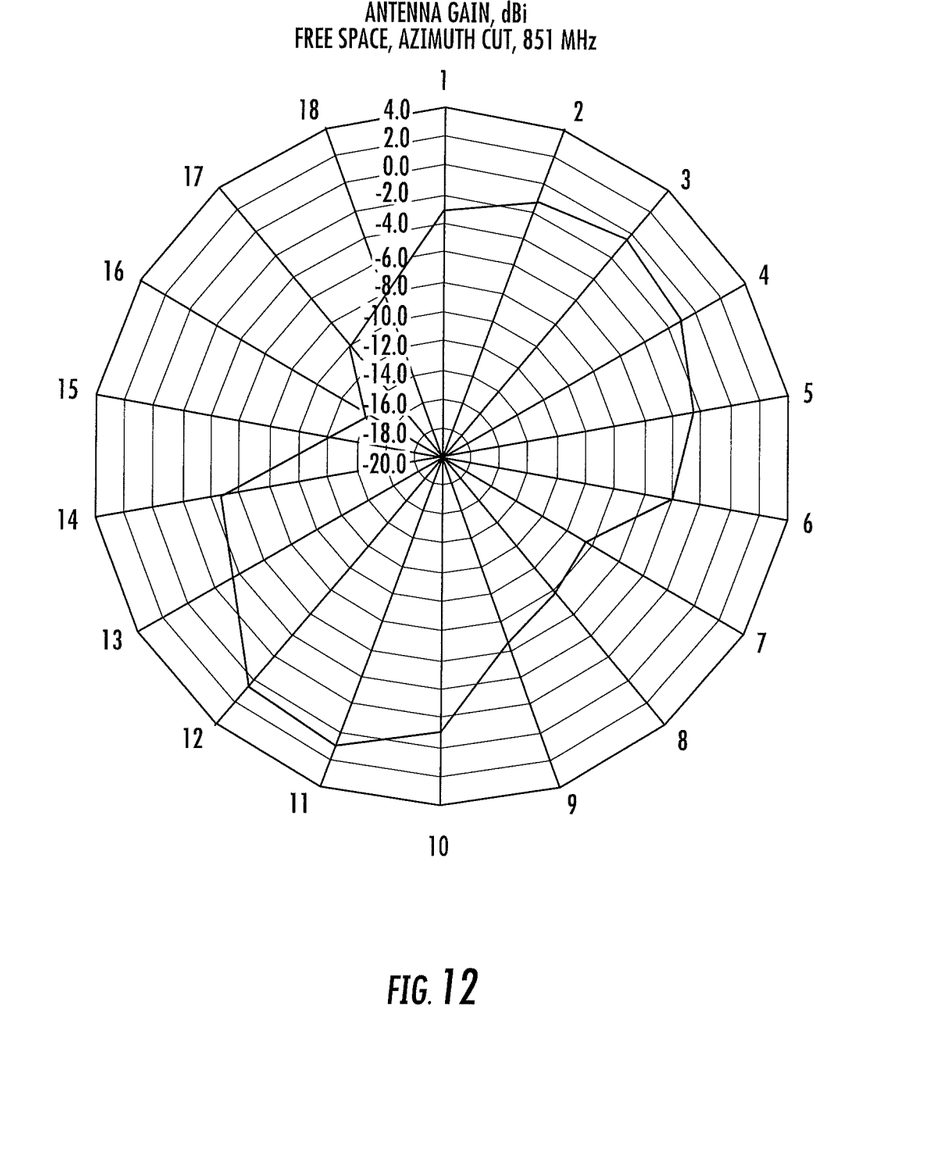
FIG. 12 is a diagram illustrating antenna gain (dBi) for a frequency of 851 MHz in accordance with some embodiments of the present inventive concept.

FIG. 11 is a diagram illustrating test data for the antenna pattern (gain in dBi) for an azimuth cut for a frequency of 839 MHz in accordance with some embodiments of the present inventive concept. Similarly, FIG. 12 is a diagram illustrating test data for the antenna pattern (gain in dBi) for an azimuth cut for a frequency of 851 MHz in accordance with some embodiments of the present inventive concept.

It will be understood that the simulation and test results discussed above with respect to FIGS. 7 through 12 are provided for example only and that embodiments of the present inventive concept are not limited thereby.

Figure 13:
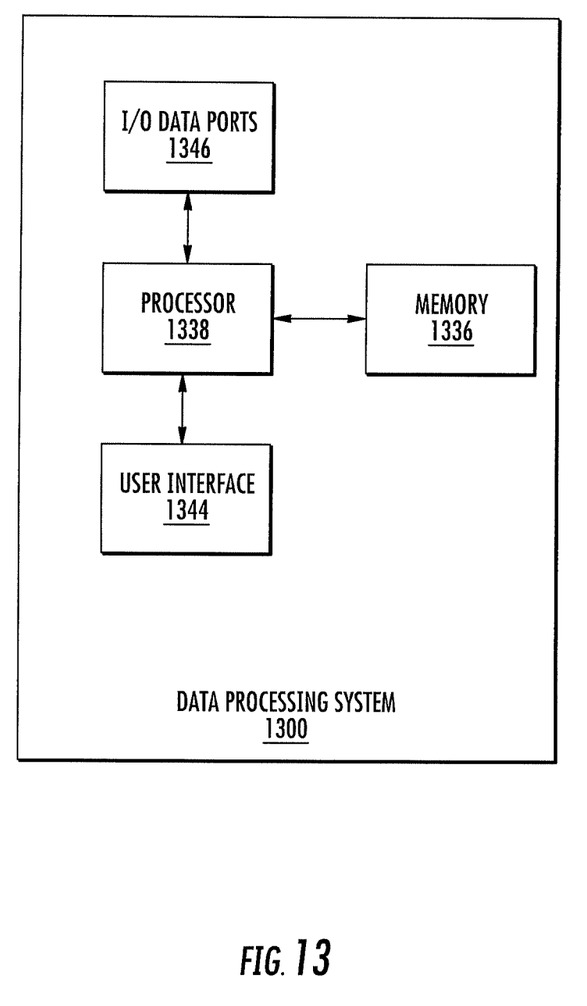
FIG. 13 is a block diagram illustrating a data processing system that is suitable for use in accordance with some embodiments of the present inventive concept.

Referring now to FIG. 13, an exemplary embodiment of a data processing system 1300 suitable for use with smart meters in accordance with some embodiments of the present inventive concept will be discussed. For example, the data processing system may be included in a communications device at the utility that is in communication with the smart meter. The communication between the smart meter and the communications device is facilitated by the antenna positioned in the meter in accordance with embodiments discussed herein. As illustrated in FIG. 13, the data processing system includes a user interface 1344 such as a display, a keyboard, keypad, touchpad or the like, I/O data ports 1346 and a memory 1336 that communicates with a processor 1338. The I/O data ports 1346 can be used to transfer information between the data processing system 1300 and another computer system or a network. These components may be conventional components, such as those used in many conventional data processing systems, which may be configured to operate as described herein. This data processing system 1300 may be included any type of computing device without departing from the scope of the present inventive concept. For example, the computing device may be mobile device, such as a smart phone, a tablet and the like, or a desk top device.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A folded antenna comprising:
an antenna having a fold therein,
wherein the fold in the antenna divides the antenna into fest and second radiating portions, the first radiating portion of the folded antenna being planar and the second radiating portion having a window therein and having a different shape than the first radiating portion, the shape of the second radiating portion providing a length that supports a radiating frequency of the folded antenna; and
wherein the first and second radiating portions of the folded antenna are coupled at the fold in the antenna having a predetermined angle therebetween; and
an RF feed leg and a ground leg, different from the RF feed leg, connected at a same edge of the second radiating portion having the window therein, the RF feed leg and the ground leg being spaced apart and parallel to one another.

2. The folded antenna of claim 1, wherein the angle between the first and second radiating portions of the folded antenna is about 90 degrees such that the first and second radiating portions of the folded antenna are substantially perpendicular to one another.

3. The folded antenna of claim 1:
wherein the RF feed leg and the ground leg are coupled to a printed circuit board (PCB) having first and second surfaces; and
wherein the PCB is a ground plane for the antenna.

4. The folded antenna of claim 3, wherein the first radiating portion of the folded antenna is spaced apart from the first surface of the PCB by a space of from about 1.0 mm to about 3.0 mm.

5. The folded antenna of claim 3, wherein the RF feed leg and the ground leg are coupled to a first surface of the PCB having few components thereon.

6. The folded antenna of claim 3, wherein the first surface of the PCB further comprises capacitors thereon, the capacitors being removed and spaced apart from the folded antenna on the first surface of the PCB.

7. The folded antenna of claim 1, wherein the folded antenna resonates at and is tuned for frequencies of 839 MHz and 851 MHz.

8. The folded antenna of claim 1, wherein the planar first radiating portion of the folded antenna has a width W2 of from about 43 mm to about 45 mm and a height H1 of from about 20 mm to about 22 mm.

9. The folded antenna of claim 1, wherein the windowed second radiating portion of the folded antenna comprises first, second and third sides forming a triangle with a window therebetween.

10. The folded antenna of claim 9, wherein the first side has an interior length L1 of from about 20 mm to about 24 mm and an exterior length L4 of from about 30 mm to about 32 mm; the second side has an interior length L2 of from about 26 mm to about 30 mm and an exterior length L5 of from about 35 mm to about 37 mm; and the third side has an interior length L3 of from about 32 mm to about 36 mm and an exterior length L6 of from about 43 mm to about 45 mm.

11. The folded antenna of claim 9, wherein the presence of the window reduces a possibility that a short will occur between sides of the triangle and simulates a longer length to provide a specific frequency.

12. An antenna system comprising: a folded antenna comprising:
first and second radiating portions, the first radiating portion of the folded antenna being planar and the second radiating portion having a window therein and having a different shape than the first radiating portion, the shape of the second radiating portion providing a length that supports a radiating frequency of the folded antenna and wherein the first and second radiating portions of the folded antenna are coupled, at the fold in the antenna having an predetermined angle therebetween; and
an RF feed leg and a ground leg, different from the RF feed leg, connected at a same edge of the second radiating portion having the window therein, the RF feed leg and the ground leg being spaced apart and parallel to one another; a housing configured to receive the folded antenna therein; and a printed circuit board (PCB) coupled to the folded antenna and configured to cover the folded antenna when the folded antenna is positioned in the housing.

13. The antenna system of claim 12, wherein the angle between the first and second radiating portions of the folded antenna is about 90 degrees such that the first and second radiating portions of the folded antenna are substantially perpendicular to one another.

14. The antenna system of claim 12:
wherein the RF feed leg and the ground leg are coupled to the printed circuit board (PCB), the PCB having first and second surfaces; and
wherein the PCB is a ground plane for the antenna.

15. The antenna system of claim 12, wherein the first radiating portion of the folded antenna is spaced apart from the first surface of the PCB by a space of from about 1.0 mm to about 3.0 mm.

16. The antenna system of claim 12, wherein the folded antenna resonates at and is tuned for frequencies of 839 MHz and 851 MHz.

17. The antenna system of claim 12, wherein the windowed second radiating portion of the folded antenna comprises first, second and third sides forming a triangle with a window therebetween.

18. A smart meter comprising a folded antenna system, the folded antenna system comprising:
a folded antenna comprising:
first and second radiating portions, the first radiating portion of the folded antenna being planar and the second radiating portion having a window therein and having a different shape than the first radiating portion, the shape of the second radiating portion providing a length that supports a radiating frequency of the folded antenna and wherein the first and second radiating portions of the folded antenna are coupled at the fold in the antenna having an predetermined angle therebetween;
an RF feed leg and a ground leg, different from the R.F feed leg, connected at a same edge of the second radiating portion having the window therein, the RF feed leg and the ground leg being spaced apart and parallel to one another; and a housing configured to receive the folded antenna therein; and a printed circuit board (PCB) coupled to the folded antenna and configured to cover the folded antenna when the folded antenna Is positioned in the housing.

19. The smart meter of claim 18, wherein the angle between the first and second radiating portions of the folded antenna is about 90 degrees such that the first and second radiating portions of the folded antenna are substantially perpendicular to one another.

20. The smart meter of claim 18:
wherein the RF feed leg and the ground leg are coupled to the printed circuit board (PCB), the PCB having first and second surfaces; and
wherein the PCB is a ground plane for the antenna.

* * * * *

UNITED STATES PATENT AND TRADEMARK OFFICE
CERTIFICATE OF CORRECTION

PATENT NO. : 10,797,392 B2  
APPLICATION NO. : 15/722098  
DATED : October 6, 2020  
INVENTOR(S) : Ronald D. Boesch Page 1 of 1

It is certified that error appears in the above-identified patent and that said Letters Patent is hereby corrected as shown below:

In the Claims

Column 10, Line 27, change "fest" to -- first --.

Column 11, Line 30, change "coupled, at" to -- coupled at --.

Column 12, Line 28, change "R.F" to -- RF --.

Column 12, Line 26, change "Is" to -- is --.

Signed and Sealed this  
Seventeenth Day of November, 2020

Andrei Iancu  
*Director of the United States Patent and Trademark Office*